Aug. 11, 1936.  F. O. GRAHAM  2,050,836
CLUTCH FOR REFRIGERATING APPARATUS
Filed March 28, 1932  2 Sheets-Sheet 1
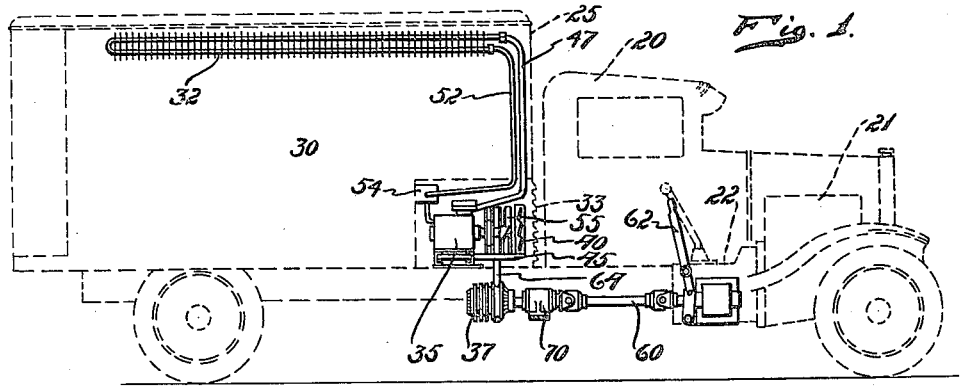
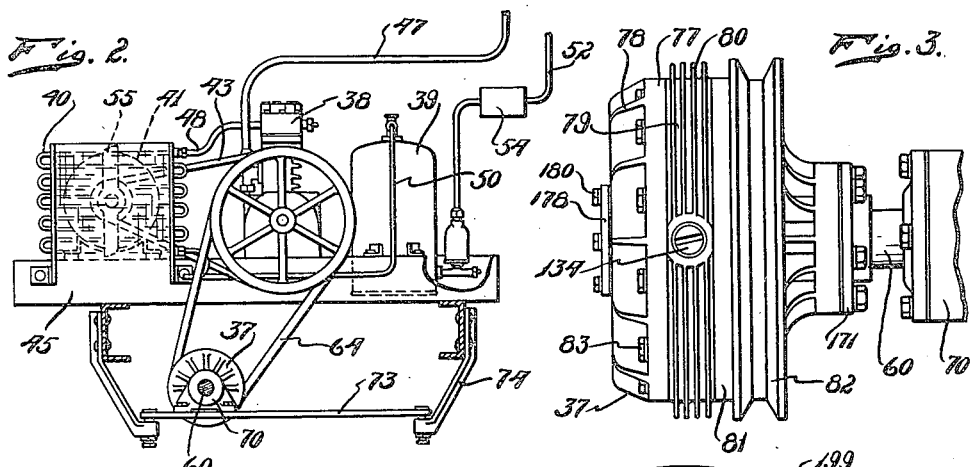
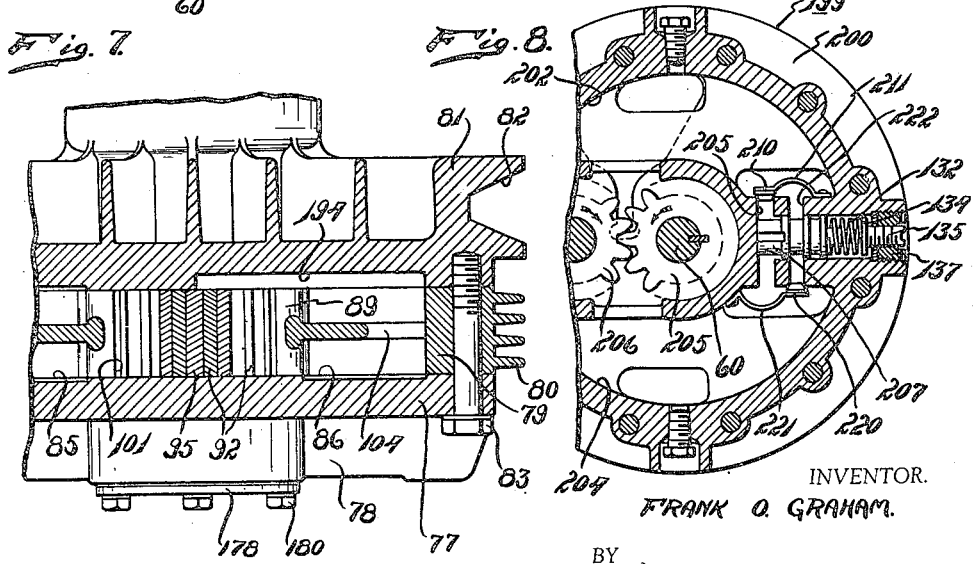
INVENTOR.
FRANK O. GRAHAM.
BY Ralph E. Baker
ATTORNEY.

Aug. 11, 1936.     F. O. GRAHAM     2,050,836
CLUTCH FOR REFRIGERATING APPARATUS
Filed March 28, 1932     2 Sheets-Sheet 2
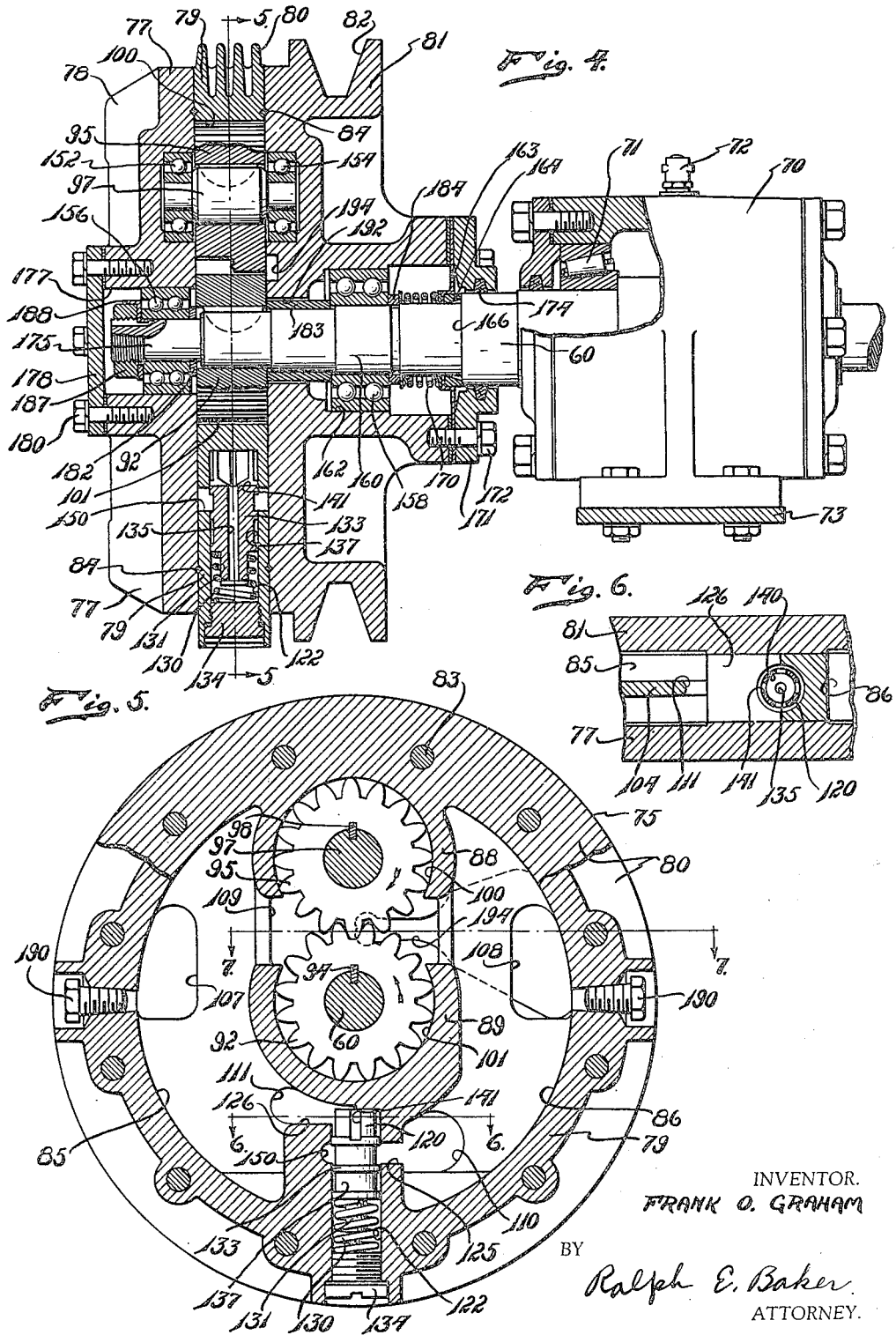
INVENTOR.
FRANK O. GRAHAM
BY
Ralph E. Baker
ATTORNEY.

Patented Aug. 11, 1936

2,050,836

UNITED STATES PATENT OFFICE 2,050,836

CLUTCH FOR REFRIGERATING APPARATUS

Frank O. Graham, Detroit, Mich., assignor to Kelvinator Corporation, Detroit, Mich., a corporation of Michigan Application March 28, 1932, Serial No. 601,506

4 Claims. (Cl. 192—61)

This invention relates to refrigerating apparatus and particularly to apparatus used for operating refrigerating apparatus.

An object of the present invention consists in providing a new and original type of hydraulic regulator which lends itself to strong and durable construction and which is simple and inexpensive to manufacture.

Another object is to provide an improved fluid pressure controlled mechanism for operating a work device at a substantially constant predetermined rate of speed at which the work device is designed to operate from a source of power which develops a rate of speed other than the rate of speed at which the work device is designed to operate.

A further object is to provide an improved hydraulic speed regulator, the operation of which is controlled by mechanism located entirely within the interior of said regulator so that no moving parts, with the possible exception of the driving member, are located on the outer surfaces of the regulator.

Further objects and advantages of the present invention will be apparent from the following description, reference being had to the accompanying drawings, wherein a preferred form of the present invention is clearly shown.

In the drawings:

Fig. 1 is a view indicating diagrammatically a refrigerating system in connection with a motor vehicle constructed in accordance with my invention, Fig. 2 is an enlarged view of a portion of the refrigerating system removed from the vehicle, Fig. 3 is a view in elevation of the hydraulic speed regulator embodying features of the invention, Fig. 4 is an enlarged vertical view in cross section of the regulator and showing a supporting bearing box for the regulator, partly in cross section and partly in elevation, Fig. 5 is a view in cross section of the regulator, taken along the line 5—5 of Fig. 4, Fig. 6 is a fragmentary view in cross section of the regulator, taken along the line 6—6 of Fig. 5, Fig. 7 is a fragmentary view in cross section, taken along the line 7—7 of Fig. 5, and Fig. 8 is a view in cross section of a modified form of speed regulator embodying features of my invention.

Referring to the drawings, the numeral 20 indicates any suitable motor vehicle operated by motor 21 and includes the usual transmission 22. The truck is provided with a body portion 25 divided into an insulated refrigerating compartment 30 and a machinery compartment 31. The vehicle carries a refrigerating system diagrammatically represented as including a cooling or evaporating unit 32 located in the refrigerating compartment, and in the machinery compartment there is located a condensing unit 35 which is adapted to be operated by the motor 21 at a substantially constant speed through the medium of a hydraulic speed regulator 37 as is hereinafter more fully described.

Referring more in detail to the drawings, the condensing unit 35 may be of any suitable type and as herein shown includes a compressor 38, liquid refrigerant receiver 39, condenser 40, and electric motor 41 connected with the compressor 38 by belt 43. These parts are all mounted on an angle iron base 45 which is supported by the chassis frame of the vehicle in compartment 31. The compressor withdraws refrigerant vapor from the evaporator through a vapor conduit 47, compresses the vapor and through a conduit 48 delivers it to the condenser 40 wherein it is liquefied and from which it is delivered through conduit 50 to the receiver 39. Liquid refrigerant is supplied to the evaporator from the receiver through a liquid supply conduit 52 under the control of an expansion valve 54.

The machine compartment 31 is provided with a louvred front panel 33 and an opening in the lowermost part thereof to permit the free circulation of air therethrough. Such a circulation of air is utilized for cooling the condenser and to remove heat generated in compartment 31. For the purpose of creating a sufficient flow of air a fan 55 is provided. The fan 55 is mounted on the armature shaft of the motor 41. This fan is arranged to be operated by the motor 41 when the motor is operating the compressor and is adapted to be operated by the compressor through belt 43 when the compressor is being operated by the vehicle motor. During periods when the vehicle motor is employed for operating the compressor, the armature and its shaft of the motor 41 rotate merely to drive the fan 55.

During periods when the compressor is operated by the motor of the vehicle, the motor 41 is unnecessary. However, in the event it is desired to refrigerate the compartment 30, when the vehicle motor is not in operation, for instance, overnight when the vehicle is in the garage, the motor 41 may be connected to the usual electric source of supply in the garage for operating the compressor 38.

The refrigerating system is preferably intermittently operated and is adapted to maintain substantially constant temperatures in the compartment 30. Any suitable means such as a thermostatically controlled electric switch (not shown) responsive to changes in temperature within the compartment 30 may be used to close and open the motor circuit for controlling the on and off phases of the refrigerating cycle of the system when the motive power is the motor 41.

As shown in the drawings, the hydraulic regulator 37 is connected to the vehicle motor by a power take off shaft 60 which is adapted to be moved into and out of engagement with the transmission 22 by lever 62 as desired. A belt 64 is used to drive the compressor by the regulator 37. The regulator is located on the exterior of the truck and the regulator end of the shaft 60 is supported in a suitable bearing box 70 provided with roller bearings 71. A fitting 72 is provided for permitting suitable lubricant to be supplied to the interior of the box 70. This box not only provides an adequate support for the regulator 37 but also permits the shaft 60 to rotate with only a negligible amount of friction. The bearing box 70 is mounted on a supporting frame 73 carried by brackets 74 depending from the chassis frame of the vehicle.

In order to provide proper refrigeration within the compartment 30 when the compressor is operated by the vehicle motor, any suitable signal device such as a thermostatically controlled light or thermometer (not shown) responsive to changes in temperatures in compartment 30 may be located on the dash board or other conspicuous place on the vehicle to notify the operator of the vehicle when to engage and disengage the shaft 60 with the transmission.

As shown in Figs. 3, 4, 5, 6, and 7 the regulator comprises in general a fluid-tight rotatable housing 75 formed preferably by three casting members, namely, an outer member 77 having a plurality of radial heat dissipating fins 78 formed integrally therewith, a central member 79 having annular heat dissipating fins 80 formed integrally therewith, and a third member 81 which is provided with a V shaped pulley means 82 formed integrally therewith on its outer periphery for receiving belt 64. These three members are suitably secured together by screws 83 and between the joints of said members there are provided suitable gasket members 84.

Within the housing 75 there are provided two compartments, namely, a low pressure compartment 85 and a high pressure compartment 86 both of which are adapted to be filled with fluid, preferably non-compressible fluid, such as lubricating oil. These compartments are separated from one another by partition means including inwardly extending portions 88 and 89 of the casting 79, a sun gear 92 secured to shaft 60 by key 94 for rotation with said shaft and a planetary gear 95 which is secured to a shaft 97 by a key 98. The inwardly extending portions 88 and 89 of casting 79 are recessed as at 100 and 101, which recesses provide substantially semi-cylindrical sheathings for gears 95 and 92 respectively. A central web 10, best shown in Fig. 7, is provided for strengthening the portions 88 and 89. Openings 107, 108, 109, 110, and 111 are provided in web 104 for establishing communication between opposite sides of the web. The gears 92 and 95 are arranged for rotation within the opening 109 and the recesses 100 and 101 and constitute the fluid pumping means for delivering fluid from the low to the high pressure compartment for effecting rotation of the regulator to drive the compressor as is hereinafter described.

In order to provide means for controlling the speed of the housing 75, I have provided a by-pass valve 120. The valve 120 is adapted to control the pressures and the flow of fluid in the housing 75 during normal operation of the refrigerating system and the regulator 37 to thereby provide for the operation of the compressor at a substantially constant predetermined rate of speed after the speed of the vehicle motor attains a predetermined value as is hereinafter more fully described. This valve is of the piston type, radially disposed and arranged to slide in a bore 122 provided in the inwardly extending portion 89 of casting 79. The valve 120 controls passages 125 and 126 between compartments 85 and 86. This valve is arranged to open by centrifugal force against the action of a coiled spring 130 which surrounds a reduced portion 131 of the valve body 133 within bore 122. The spring applies its force on the valve body on its one end and abuts a removable plug 134 on the other end. In order to prevent a dash-pot action in the bore 122, I have provided the valve 120 with a longitudinal bore 135. An annular groove 137 is provided on the body portion 133 of valve 120 to provide a space between the valve body and the walls of the bore 122 for receiving dirt particles to prevent binding of the valve. To provide the valve proper 120, the body portion 133 is drilled as at 140 and is provided with four longitudinal equally spaced slots 141. Thus when the valve is moved to open position, the flow of fluid from the high pressure compartment to the low pressure compartment may freely pass from passage 125 to passage 126 through the slots 141 of valve 120. This prevents fluid pressures in compartment 86 from affecting operation of the valve and in order to further insure against pressures affecting operation of the valve, the inwardly extending portion 89 is provided with a recess 150 in communication with the passage 125 to thus provide for completely surrounding a portion of the valve with fluid in the high pressure compartment. When the valve is open, the fluid from the high pressure compartment flows to the low pressure compartment through the valve, not only from the passage 125 but also from the recess 150. Thus it will be noted that the operation of the valve is entirely unaffected by pressures within the housing. This prevents jamming of the valve.

In order to provide a valve which is operable by centrifugal force and to arrange its actuating forces which are influenced by centrifugal force entirely within the housing, I have constructed the valve body of material such, for example, as steel having sufficient weight so as to be responsive to centrifugal force for opening the valve.

In order to provide a regulator which will operate smoothly, I have journaled the shaft 97 in anti-friction ball bearing members 152 and 154 and have mounted the housing 75 on shaft 60 by means of anti-friction ball bearing members 156 and 158. Bearing members 152 and 154 are carried by castings 78 and 81 respectively. The ball bearing member 156 is mounted on a reduced portion 160 of the shaft 60. The reduced portion of the shaft and the bearing 158 are disposed within a recessed chamber 162 provided in casting 81. Chamber 162 is closed by means of a flexible diaphragm 163 and a sealing member 164 which abuts a shoulder 166 of shaft 60. A spring 170 is provided for maintaining engagement between the sealing member and shoulder 166. The diaphragm is held in place by an outer cover member 171 secured to casting 81 by screws 172. This cover plate carries an annular felt member 174 adapted to engage the shaft 60 for preventing dust and the like from coming into contact with the sealing parts. Bearing member 156 is mounted on the reduced portion 175 of shaft 60. The reduced portion 175 and bearing 156 are disposed within a recessed chamber 177 provided in casting 78. The recessed chamber 177 is closed by a removable cover plate 178 secured to casting 78 by screws 180. Suitable spacing means are provided for maintaining the bearings 156 and 158 in proper position. This spacing means comprises collars 182, 183, and 184. Collar 182 is placed between bearing 156 and gear 92, the collar 183 between gear 92 and bearing 158, and the collar 184 is placed between bearing 158 and a spring retaining means 186. These parts are all suitably locked in position by means of nut 187 threaded on the end of shaft 60. A lock washer 188 is provided for preventing accidental removal of nut 187 during operation of the regulator.

Preferably the chambers 162 and 177 are filled with oil to provide adequate lubrication for the bearings 156 and 158. Suitable removable plugs 190 are provided for admitting oil to the interior of the housing. The oil admitted to the interior of the housing enters the compartments 85 and 86 and by seepage between casting 78 and the gear 92 flows into chamber 177 and by seepage between casting 81 and gear 92 flows through an annular passageway 192 in casting 81 into chamber 162. When this takes place, some of the oil will also flow to the bearing members 152 and 154 to provide adequate lubrication therefor. Thus it will be apparent that the compartments 85 and 86 and the chambers 162 and 177 are completely filled with oil and that this oil provides adequate lubrication at all times for all of the bearing members of the regulator.

The operation of the device is as follows: Assuming that the vehicle motor 21 is in operation and that the lever 62 has been moved to place the shaft 60 in engagement with the transmission, the gear 92 in housing 75 will be operated by shaft 60 in a counter-clockwise direction as shown by the arrow in Fig. 5. This movement of gear 92 causes rotation of gear 95 in a clockwise direction as shown by the arrow in Fig. 5. Upon rotation of the gears, some of the oil in compartment 85 will be delivered to compartment 86 between the teeth of the gears and the sheathings 100 and 101. In order to prevent the possibility of moving the shafts 60 and 97 out of proper alignment in attempting to compress oil pocketed between the teeth of the gears, there is provided a cavity 194 for receiving fluid ejected by meshing of the gears. As the fluid is gradually delivered to compartment 86 or the high pressure compartment from compartment 85 or low pressure compartment by gears 92 and 95, the fluid pressure in the high pressure compartment gradually increases. When the pressure in the high pressure compartment is increased to such a point so as to overcome the resistance to rotation offered by the housing 75 in tending to drive the compressor 38, the pressure in compartment 86 will lock the gears in position and the entire regulator will rotate to drive the compressor.

During periods when the pressure within the compartment 86 is sufficient to lock the gears to rotate the housing 75, said housing rotates at the same speed of the driving shaft 60. When the speed of the housing attains a predetermined value, for instance the rate of speed at which the compressor is designed to operate, the centrifugally operated valve is moved toward the outer periphery of the housing sufficiently to open the valve to permit some fluid to be by-passed from the high to the low pressure compartment. This causes the gears 92 and 95 to resume rotation. When this takes place, a certain amount of slipping or lost motion takes place between the rotatable housing and the shaft 60. Thereafter, any slight increase in the rate of movement of the housing will cause the valve 120 to open farther to thereby increase the amount of fluid being by-passed. This allows a greater amount of slipping or lost motion to take place between the housing and the shaft 60. By resuming the rotation of the gears, said pressures would be increased in the compartment 86 if it were not for the by-pass valve 120 which, as previously stated herein, is responsive to the speed of the housing and allows fluid to be by-passed in varying proportions. That is, any slight increase in pressure within the compartment 86 which would tend to increase rotation of the housing 75 would cause the valve to open farther and allow more fluid to be by-passed to immediately reduce the pressure acting on the gears in the compartment 86 to thus permit the gears to rotate to effect a hydraulic frictional connection between the housing and the shaft 60. The weight of the valve body portion 133 and the tension of the spring 130 have been designed to permit the valve to by-pass sufficient fluid so as to maintain the movement of the housing 75 substantially constant when the speed of the housing attains a predetermined value irrespective of the variations in speed of the driving shaft 60 after the shaft 60 is running above a predetermined rate.

As the speed of the motor and consequently the speed of the housing gradually decreases, the spring 130 gradually overcomes the outward movement of the centrifugally operated valve and tends to close the valve. When the speed of the housing falls below a certain value, the spring closes the valve. Thus it will be noted that the centrifugally operated valve determines the flow of fluid within the compartments 85 and 86 to thereby determine the speed of the housing 75.

The hydraulic regulator 37 is readily adaptable for use in driving other compressors which are designed to operate at greater or less speeds by simply substituting a stronger or weaker spring for spring 130 or by filling the housing with a fluid of suitable viscosity.

Fig. 8 shows a modified form of regulator designated 199. This regulator comprises a rotatable housing 200 in which there is provided a high pressure compartment 202 and a low pressure compartment 204, a sun gear 205 secured to shaft 60, a planetary gear 206 and a by-pass valve 207 all of which correspond to like parts of the regulator 37 and operate in a like manner. This regulator however, is provided with means for preventing rotation of shaft 60 when the motor 41 is operating the compressor. This means comprises a valve 210 adapted to be held in closed position by spring 211 when the gear 95 is rotating in a clockwise direction and also when gear 95 is locked to gear 92 by fluid within the housing. However, in the event the gear 95 is rotated in the counter-clockwise direction, the valve 210 is arranged to be opened by a slight increase in pressure in the compartment 204. This slight increase in pressure takes place due to the rotation of gear 95 in a counter-clockwise direction, the compartment 204 then becoming the high pressure compartment and the compartment 202 becoming the low pressure compartment. When the valve 210 is in an open position, fluid freely circulates from one compartment to another through valve 210 and passage 215 to prevent any pressures from building up in compartments 202 and 204. Among the times when gear 95 would be rotated in a counter-clockwise direction is when the motor 41 is driving the compressor. At this time the housing 75 would be rotated by belt 64. This causes gear 95 to rotate about gear 92. This rotation builds up a slight pressure in compartment 204 which opens valve 200 and if it were not for valve 200 the pressure in compartment 204 would soon increase sufficiently to lock gears 95 and 92 and thus cause rotation on shaft 60. This not only prevents a waste of power utilized in driving shaft 60 but also avoids the danger of damage to the transmission 22 which would be likely to take place by rotation of shaft 60 when the motor 21 is inoperative, and in the event the shaft 60 was inadvertently left in engagement with the transmission.

A valve 220 is also shown in Fig. 8. Valve 220 is normally held closed by spring 221. This valve is responsive to abnormally high pressures within the compartment 202 for permitting the free circulation of fluid through passage 222 between the compartments 202 and 204 in the event the pressures in the compartment 202 become dangerously high. Abnormally high pressures within the compartment 202 may take place as a result of abnormal conditions within the refrigerating system such as "sticking of the compressor". By failure of the compressor to operate, the housing 75 would remain stationary and the gears 92 and 95 would continue to rotate and build up the pressure in compartment 202 until it would become dangerously high if it were not for valve 220. Another condition causing abnormally high pressures in compartment 202 would be the sudden engagement of shaft 60 with transmission 22 when motor 21 is operating at a high rate of speed.

In the regulator 199 the valve 207 corresponds to and operates in a like manner as does valve 130. As shown in Fig. 8 a spring 132 is provided to resist the outward movement of the valve 130. This spring abuts the valve body on one end and on the other end abuts a shoulder 134 of an adjustable member 135 which is screw threaded into a removable plug 137. This arrangement permits adjustment of the tension of spring 132 to thereby render the regulator readily adaptable for use in operating compressors designed to operate at different speeds.

From the foregoing it will be apparent that I have provided for refrigerating a motor vehicle by a refrigerating apparatus of the compression type and that I have arranged for operating the compressor of said refrigerating apparatus at a substantially constant speed by the motor of the vehicle. It will also be noted that the compressor is operated by the vehicle motor through the medium of a hydraulic speed regulator, the hydraulic action of which becomes gradually effective to initially operate the compressor and that means are provided for maintaining said hydraulic action substantially constant after the speed of the regulator attains a certain value to thereby control the rate of movement of the compressor. This arrangement provides for the transmission of power to the compressor from the vehicle motor in a smooth and non-fluctuating manner.

It will also be apparent from the foregoing that I have provided a hydraulic regulator for operating a compressor at a substantially constant speed by power received from the vehicle motor and that I have arranged the control mechanism of the regulator and its operating parts entirely within a fluid tight housing. This arrangement is advantageous in that it avoids any possibility of leakage of fluid from the housing and also eliminates the possibility of dirt particles and the like from interfering with the proper operation of the regulator. This latter arrangement is particularly advantageous where the regulator is located on the exterior of the vehicle.

Although a preferred embodiment of my invention is herein shown in connection with a motor vehicle, it is to be understood that all types of vehicles such for example as railway cars come within the scope of the invention and that it is immaterial whether the power for operating the refrigerating apparatus is derived from the vehicle motor or from motion of the vehicle.

Although only a preferred form of the invention has been illustrated, and that form described in detail, it will be apparent to those skilled in the art that various modifications may be made therein without departing from the spirit of the invention or from the scope of the appended claims.

What is claimed is as follows:

1. The combination with a variable speed driving element of a rotatable driven element including a housing, partition means dividing said housing into two compartments, said partition means including fluid pumping means for delivering fluid from one compartment to another, means providing a by-pass between said compartments, a radially disposed piston type valve member arranged for movement in said partition means for opening said by-pass in accordance with increasing speed, and means for preventing a dash pot action during operation of said valve.

2. The combination with a variable speed driving element of a rotatable driven element including a housing, partition means dividing said housing into two compartments, said partition means including fluid pumping means for delivering fluid from one compartment to another, said pumping means including a sun gear actuated by said driving element and a planetary gear in mesh with said sun gear, means providing a by-pass between said compartments, and a radially disposed piston type valve member arranged for movement in said partition means for controlling said by-pass, said piston type valve being influenced by centrifugal force for opening said valve after the speed of one of said elements attains a predetermined value.

3. The combination with a variable speed driving element of a rotatable driven element including a housing, partition means dividing said housing into two compartments, said partition means including fluid pumping means for delivering fluid from one compartment to another, said pumping means including a sun gear actuated by said driving element and a planetary gear in mesh with said sun gear, means providing a by-pass between said compartments, means responsive to pressure in said low pressure compartment for opening said by-pass to prevent reverse operation, and a radially disposed piston type valve member arranged for controlling said by-pass, said piston type valve being influenced by centrifugal force for opening said valve after the speed of one of said elements attains a predetermined value.

4. In a constant speed power transmitting system the combination of a pair of power transmitting elements, hydraulic speed regulating means operatively connected between said elements comprising a pair of fluid enclosing chambers, fluid pumping means actuated by relative movement between said elements for pumping fluid from one of said chambers to the other, a by-pass passage for discharging the pumped fluid, a radially slidable valve piston of pressure balanced conformation in said passageway for by-passing the pumped fluid in accordance with the speed of one of said elements and irrespective of its rate of acceleration or the pressure of the fluid, and an aperture extending axially through said valve piston to by-pass displacement fluid therethrough thereby providing quick response and eliminating dash-pot effects.

FRANK O. GRAHAM.